United States Patent
Veramendi et al.

(10) Patent No.: US 10,848,972 B2
(45) Date of Patent: Nov. 24, 2020

(54) MOBILE DEVICE WIRELESS RESTRICTED PERIPHERAL SESSIONS

(71) Applicant: Microsoft Technology Licensing, LLC, Redmond, WA (US)

(72) Inventors: Pablo Veramendi, Redmond, WA (US); David Michael Callaghan, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 135 days.

(21) Appl. No.: 15/787,488

(22) Filed: Oct. 18, 2017

(65) Prior Publication Data

US 2019/0116497 A1 Apr. 18, 2019

(51) Int. Cl.
*H04W 12/08* (2009.01)
*G06F 21/53* (2013.01)
(Continued)

(52) U.S. Cl.
CPC .......... *H04W 12/08* (2013.01); *G06F 1/1698* (2013.01); *G06F 3/002* (2013.01); *G06F 3/01* (2013.01); *G06F 3/0231* (2013.01); *G06F 3/038* (2013.01); *G06F 9/4411* (2013.01); *G06F 21/53* (2013.01); *G06F 21/82* (2013.01); *H04M 1/7253* (2013.01); *G06F 1/3287* (2013.01); *G06F 21/84* (2013.01); *G06F 21/85* (2013.01); *G06F 2203/0384* (2013.01); *G06F 2221/2149* (2013.01)

(58) Field of Classification Search
CPC ................. G06F 9/4411; G06F 21/82
See application file for complete search history.

(56) References Cited

U.S. PATENT DOCUMENTS 8,135,342 B1   3/2012 Harold
8,255,988 B2 *  8/2012 Carpenter ............. G06F 21/575
                                            710/5

(Continued)

FOREIGN PATENT DOCUMENTS

EP      3018556 A1    5/2016

OTHER PUBLICATIONS

"Team Viewer 9 Manual Remote Control, www.teamviewer.com" (Year: 2014).*

(Continued)

*Primary Examiner* — Phil K Nguyen
(74) *Attorney, Agent, or Firm* — Klarquist Sparkman, LLP

(57) ABSTRACT

Wireless restricted peripheral sessions are described herein. In a wireless restricted peripheral session, a mobile device has wireless access to peripheral devices and associated resources of a computing device but is restricted from accessing other resources of the computing device (such as files or applications unrelated to the peripheral devices). The mobile device can then receive input provided through a keyboard or mouse associated with the computing device, for example, and can provide information for display on a monitor associated with the computing device. A wireless restricted peripheral session can be established through a variety of approaches that can include the use of hardware, firmware, software, and/or virtual machine sessions. Wireless restricted peripheral sessions allow a visitor with a mobile device to work using peripheral devices of an organization's computer in a secure manner.

18 Claims, 13 Drawing Sheets

(51) Int. Cl.

| | | |
|---|---|---|
| *G06F 9/44* | (2018.01) | |
| *G06F 21/82* | (2013.01) | |
| *G06F 9/4401* | (2018.01) | |
| *G06F 3/01* | (2006.01) | |
| *G06F 3/038* | (2013.01) | |
| *G06F 3/023* | (2006.01) | |
| *G06F 3/00* | (2006.01) | |
| *G06F 1/16* | (2006.01) | |
| *H04M 1/725* | (2006.01) | |
| *G06F 21/84* | (2013.01) | |
| *G06F 21/85* | (2013.01) | |
| *G06F 1/3287* | (2019.01) | |

(56) References Cited

U.S. PATENT DOCUMENTS

| | | | | |
|---|---|---|---|---|
| 9,015,068 | B1* | 4/2015 | Bertz | G06Q 30/0633 |
| | | | | 705/26.8 |
| 9,119,156 | B2 | 8/2015 | Green et al. | |
| 9,864,754 | B2* | 1/2018 | Jiang | G06F 16/176 |
| 2007/0132768 | A1 | 6/2007 | Podnar et al. | |
| 2007/0143824 | A1* | 6/2007 | Shahbazi | H04L 63/083 |
| | | | | 726/1 |
| 2008/0209199 | A1 | 8/2008 | Sadovsky et al. | |
| 2008/0222663 | A1* | 9/2008 | Carpenter | G06F 12/145 |
| | | | | 719/328 |
| 2009/0172770 | A1* | 7/2009 | Sandage | G06Q 30/06 |
| | | | | 726/1 |
| 2011/0131372 | A1* | 6/2011 | Knippel | G06F 9/45516 |
| | | | | 711/109 |
| 2011/0167470 | A1* | 7/2011 | Walker | H04L 63/20 |
| | | | | 726/1 |
| 2014/0196112 | A1* | 7/2014 | Huang | G06F 1/1632 |
| | | | | 726/3 |
| 2014/0351479 | A1* | 11/2014 | Lee | H04W 76/14 |
| | | | | 710/303 |
| 2015/0370730 | A1 | 12/2015 | Johnson | |
| 2016/0014172 | A1* | 1/2016 | Van De Laar | H04L 65/403 |
| | | | | 709/229 |
| 2017/0046211 | A1* | 2/2017 | Jayawardena | G06F 11/079 |
| 2017/0111761 | A1 | 4/2017 | Tarlton | |
| 2017/0353313 | A1* | 12/2017 | Goldman | H04L 9/3247 |
| 2018/0225458 | A1* | 8/2018 | Austin | G06F 21/572 |
| 2019/0012463 | A1* | 1/2019 | Luff | G06F 21/57 |
| 2019/0034902 | A1* | 1/2019 | Bukovics | G06F 13/10 |

OTHER PUBLICATIONS

"International Search Report and Written Opinion Issued in PCT Application No. PCT/US2018/055313", dated Jan. 21, 2019, 13 Pages.

Phillips, Gavin, "Continuum: Switch Between Windows 10 Desktop & Tablet Mode", Published on: Aug. 27, 2015, Available at: http://www.makeuseof.com/tag/continuum-switch-windows-10-desktop-tablet-mode/.

Smith, Chris, "New ad shows a killer Windows 10 phone feature the iPhone 6s and Nexus 5X don't have", Published on: Oct. 19, 2015, Available at: http://bgr.com/2015/10/19/windows-10-continuum-iphone-6s-nexus-5x/.

"Get Started with Windows 10 Mobile", Published on: Dec. 18, 2015, Available at: http://windows.microsoft.com/en-in/windows-10/getstarted-continuum-mobile.

"Mobile Device Support for iOS", Published on: Apr. 15, 2015, Available at: http://www.islonline.com/remote-support/mobile/ios.htm.

Linder, Brad, "Acer Jade Primo: Smartphone becomes a PC with Windows 10 Continuum", Published on: Sep. 2, 2015, Available at: http://liliputing.com/2015/09/acer-jade-primo-smartphone-becomes-a-pc-with-windows-10-continuum.html.

Schenck, Stephen, "Acer doesn't skimp on new Windows 10 phone: bundles Continuum dock", Published on: Oct. 12, 2015, Available at: http://pocketnow.com/2015/10/12/acer-windows-10-continuum-dock.

"Continuum", Published on: Jan. 24, 2016, Available at: https://msdn.microsoft.com/en-us/library/windows/hardware/dn917883(v=vs.85).aspx.

"Set up and use Back to My Mac", Published on: Oct. 31, 2015, Available at: https://support.apple.com/en-us/HT204618.

"How to use a smartphone as a desktop PC", Published on: Mar. 7, 2016, Available at: http://www.deccanchronicle.com/technology/mobiles-and-tabs/070316/how-to-use-a-smartphone-as-a-desktop-pc.html.

Pinola, Melanie, "Smartphones and Laptops: New Ways to Pair Them", Published on: Jun. 25, 2012, Available at: http://www.pcworld.com/article/258167/smartphones_and_laptops_new_ways_to_pair_them.html.

Pn, et al., "3D-to-2D Projection Algorithm for Remote Control using Smartphone Enhancing Smartphone Capability for Costless Wireless Audio Visual Consumer Appliance Control", In Proceedings of 27th International Conference on Advanced Information Networking and Applications Workshops, Mar. 25, 2013, pp. 1044-1049.

Carboni, et al., "Wireless Wires: Let the User Build the Ubiquitous Computer", In Proceedings of the 6th International Conference on Mobile and Ubiquitous Multimedia, Dec. 12, 2007, 10 pages.

* cited by examiner

SOFTWARE 1180 IMPLEMENTING DESCRIBED TECHNOLOGIES

MOBILE DEVICE WIRELESS RESTRICTED PERIPHERAL SESSIONS

BACKGROUND

Computers and computer networks have become essential tools for businesses, universities, and other organizations. Organizational users typically have accounts for the organization's network that allow the users to securely log in to organization computing devices and access resources. As computing devices have become more powerful, smaller, and portable, visitors or guests are increasingly bringing outside devices, including laptop computers and mobile devices, and requesting temporary access to an organizational network. Outside laptops and mobile devices, however, typically have smaller and more limited user interfaces. While organization computing devices typically have peripheral devices that would provide a visitor or guest a more productive and pleasant user experience, the visitor is often not allowed or cannot remove a peripheral device connected to one of the organizational computing devices. It is also often the case that some peripheral device cables and connectors may change across devices or between generations of computer systems and may not be compatible with the visitor's device.

SUMMARY

Examples described herein relate to wireless restricted peripheral sessions. An example computing device can include a processor, an antenna, and computer-readable storage media storing instructions that, when executed by the processor, cause the computing device to perform operations. The operations can include establishing, via the antenna, a wireless connection between a mobile device and the computing device. The operations can also include granting the mobile device access to peripheral devices associated with the computing device and restricting access of the mobile device to some of the computing resources of the computing device. Communications can be routed between the mobile device and the peripheral devices in a wireless restricted peripheral session.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The foregoing and other objects, features, and advantages of the claimed subject matter will become more apparent from the following detailed description, which proceeds with reference to the accompanying figures.

DETAILED DESCRIPTION

Figure 1:
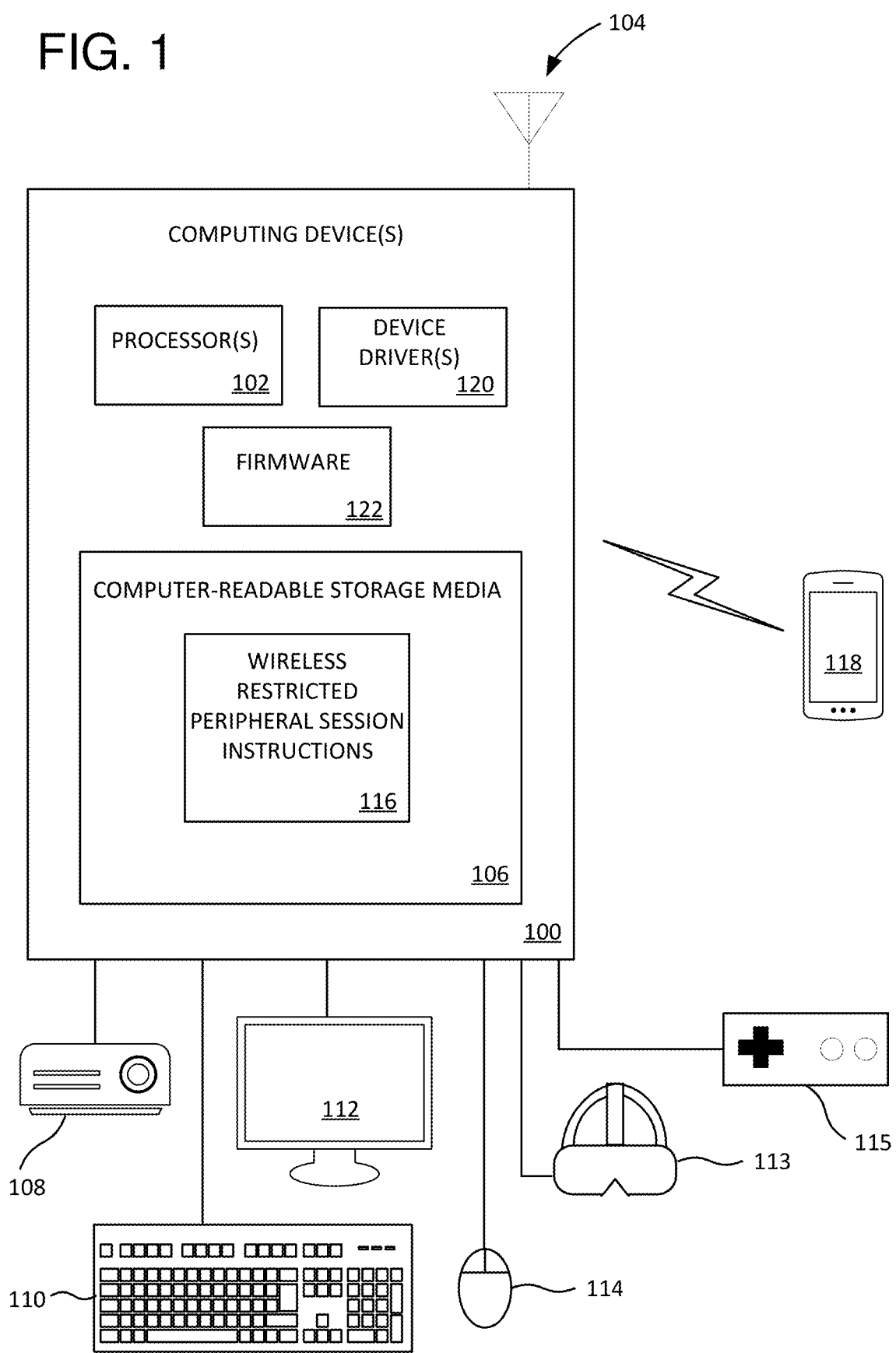
FIG. 1 is a block diagram of an example computing device configured to establish a wireless restricted peripheral session with a mobile device.

Using the systems, methods, and computer-readable media described herein, a wireless restricted peripheral session can be established between a mobile device and a computing device. In a wireless restricted peripheral mode, a mobile device has wireless access to peripheral devices and associated resources of the computing device but is restricted from accessing other resources of the computing device (such as files or applications unrelated to the peripheral devices). The mobile device can then receive input provided through a keyboard, mouse, or other input device associated with the computing device, for example, and can provide information for display on a monitor or other output device associated with the computing device.

The wireless restricted peripheral mode allows a visitor or guest of an institution to pair a personal computer or mobile device with some of an institution's computing peripherals such as a keyboard, mouse, display, printer, CD/DVD drive, SD card slot, game controller, virtual reality (VR) or augmented reality (AR) headset, or other devices. At the same time, the risk that the organization's computer system could become compromised by sharing the peripherals is reduced or eliminated by restricting access to files, applications, etc., that are not related to the peripheral devices or other supporting functions. A visitor or guest can then work using the visitor's mobile device and, for example, a full size keyboard input and display output provided by workstation computers of the institution, while the institution's computers remain secure.

A wireless restricted peripheral mode can be entered through a variety of approaches that can include the use of hardware, firmware, software, and/or virtual machine sessions. In one approach, a hardware button, switch, or other input mechanism can be pressed to request that a wireless restricted peripheral session be established, and a computer can either reboot or power on and load an alternative kernel that supports operation of peripheral devices but limits access to and operation of other computing resources (e.g., files or data associated with users in an organization or applications not associated with operation of the peripheral devices).

In another example approach, a guest or visitor can select, through a user interface or other input mechanism, to log in to a computer in a wireless restricted peripheral mode, and the computer can launch a peripheral access application, establish a virtual machine session allowing access to peripheral devices, or log the visitor into a peripheral access account that is restricted to accessing peripheral (and wireless communication, etc.) functionality.

The technology described herein allows a visitor or guest with a mobile device or laptop to connect to computers in an organizational setting in a limited manner to securely access associated peripheral devices. The described approaches are an improvement in device interoperability and connection technology as well as an improvement in account management software and firmware. Examples are described below with reference to FIGS. 1-13.

FIG. 1 illustrates a computing device 100 comprising at least one processor 102, at least one antenna 104, and one or more computer-readable storage media 106. Computing device 100 is in communication with a plurality of peripheral devices including projector 108, keyboard 110, display 112, virtual reality (VR) headset 113, mouse 114, and game controller 115. Computing device 100 can communicate with projector 108, keyboard 110, display 112, VR headset 113, mouse 114, and/or game controller 115 through wired or wireless communications, including for example, USB or Bluetooth communications. VR headset 113 can also be an augmented reality (AR) headset or other VR or AR device.

Computer-readable storage media 106 stores instructions 116 that, when executed by processor 102, cause computing device 100 to perform operations to establish a wireless restricted peripheral session and communicate with a mobile device 118 via the wireless restricted peripheral session. Mobile device 118 can be, for example, a smart phone, tablet, laptop, or other device and can be associated with a visitor or guest of an organization (e.g., who does not have an account with the organization), and computing device 100 can be associated with the organization. In the wireless restricted peripheral session, mobile device 118 is in communication with one or more of projector 108, keyboard 110, display 112, VR headset 113, mouse 114, or game controller 115 via computing device 100 but is restricted from accessing some computing resources of computing device 100. For example, mobile device 118 can be restricted from accessing settings, user accounts of the organization with which computing device 100 is associated, files, network resources, etc. In some examples, in the wireless restricted peripheral session, mobile device 118 can only access computing resources of computing device 100 associated with operation of peripheral devices (e.g., device drivers 120, data ports, etc.) and wireless communications.

In the wireless restricted peripheral session, the visitor or guest associated with mobile device 118 can provide input to, for example, keyboard 110, mouse 114, or game controller 115, and the input is communicated, via computing device 100, to mobile device 118. Similarly, mobile device 118 can generate information for display, transmit the information to computing device 100, and the information is displayed on display 112. In this way, mobile device 118 can be thought of as taking the place of computing device 100 and the peripheral devices (e.g., projector 108, keyboard 110, display 112, VR headset 113, mouse 114, and/or game controller 115) become the peripheral devices of mobile device 118.

Although a single computing device, computing device 100, is shown in FIG. 1, mobile device 118 can also connect to multiple computing devices simultaneously to create one or more wireless restricted peripheral sessions. Similarly, computing device 100 can establish wireless restricted peripheral sessions with multiple mobile devices. As an example, mobile device 118 can connect to a desktop computer to leverage a keyboard and mouse as input devices and connect to a large display TV or projector for display output using a second wireless restricted peripheral session. A computer can also establish a wireless restricted peripheral session with one mobile device to share a keyboard, mouse and display, and then establish another wireless restricted peripheral session to share its SD card or USB port with a USB storage drive to another mobile device.

As another example, mobile device 118 can connect using a restricted wireless peripheral session with computing device 100 to leverage a DVD drive (not shown) to read a DVD while establishing another restricted wireless peripheral session with a second computing device to leverage a keyboard and mouse attached to the second computer. A user can also connect a USB drive or SD card to a desktop computer that is sharing its peripherals and read/write to the USB drive or SD card plugged into the computer using mobile device 118 via a wireless restricted peripheral session. In some examples, a mobile device shares a single computing device's peripherals exclusively. Multiple mobile devices can also share portions of a display region or windows in a tabbed user interface that allow selection of which mobile device's output will be displayed. Tabs can provide different remote device display output connections or allow selection between outputs of different mobile devices that are simultaneously connected through a wireless restricted peripheral session. A computing device, such as computing device 100, can allow an arbitration of access to a peripheral device such as a printer in a wireless restricted peripheral session where a mobile device can take exclusive control over the port or peripheral or use it in a shared manner with interleaved requests or queued requests for printing outputs etc.

Figure 2:
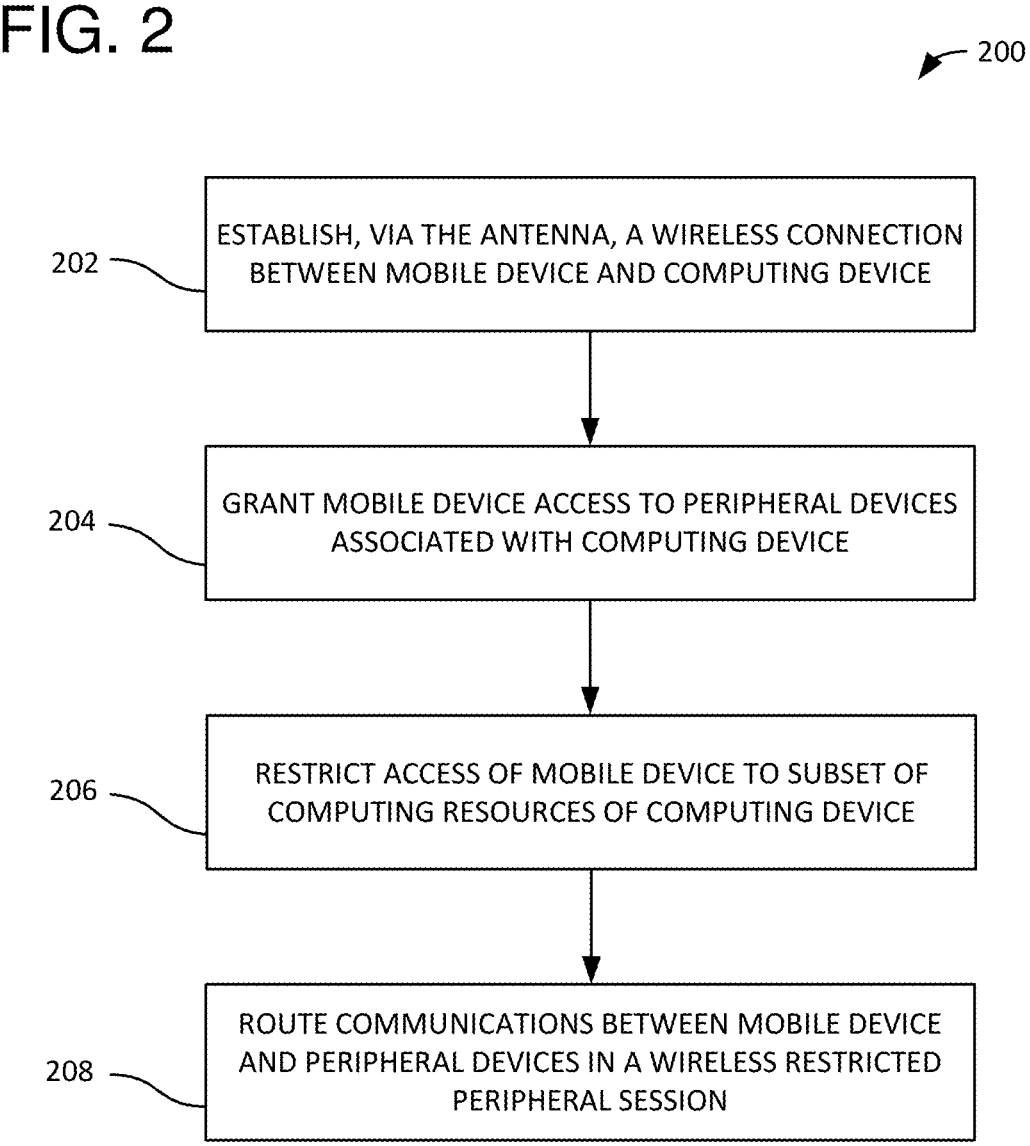
FIG. 2 is an example wireless restricted peripheral session method.

FIG. 2 illustrates an example wireless restricted peripheral session method 200. Method 200 can be performed, for example, by computing device 100 and/or mobile device 118 of FIG. 1. In process block 202, a wireless connection between a mobile device and a computing device is established (e.g., through one or more antennas of the computing device and one or more antennas of the mobile device). The wireless connection can be initiated by either the computing device or the mobile device. For example, a user can select a "peripheral access mode" from a user interface on the computing device, and mobile devices within range (e.g., within Bluetooth range) or connected to a common wireless network (e.g., over Wi-Fi) can be selected. Various example user interfaces are illustrated in FIGS. 7-10. Alternatively, a user can initiate a peripheral session mode on a mobile device and similarly search for available computing devices over Bluetooth, Wi-Fi, or other connection protocols.

In process block 204, the mobile device is granted access to one or more peripheral devices associated with the computing device. Peripheral devices can include a keyboard, a mouse, a projector, a display, a printer, a speaker, a microphone, or other devices. In process block 206, access of the mobile device to a subset of computing resources of the computing device is restricted. For example, access of the mobile device to user accounts, applications not involved with peripheral access, network resources, files, etc., can be restricted. In process block 208, communications are routed between the mobile device and the one or more peripheral devices in a wireless restricted peripheral session.

Granting access to peripheral devices in process block 204 and restricting access to some computing resources in process block 206 can be performed through several approaches. In one approach, a virtual machine session can be established in which access of the mobile device to the subset of computing resources of the computing device is restricted. Routing of communications between the mobile device and computing device is performed in the virtual machine session. The virtual machine session can be established on the computing device itself or can be established on a remote computer (e.g., in the cloud).

In some instances, the computing device can idle or suspend one or more processor cores and allocate limited computing resources such as limited RAM and cache storage to implement the restricted wireless peripheral sharing session or sessions. When a user disconnects the mobile device, thereby ending the restricted wireless peripheral session, the computing device can return to normal resource utilization and operation with or without rebooting.

In some virtual machine session implementations, the mobile device is associated with a first user (e.g., a visitor or guest), and the virtual machine session is established while a second user (e.g., a user with an account on the computing device) is logged into the computing device. In this way, the second user can remain logged in and the first user is prevented, because of a limited virtual machine session, from accessing data associated with the second user's account. A virtual machine session can be established, for example, after a wireless restricted peripheral session option is selected from a lock screen presented on a display associated with the computing device.

Granting and restricting access can also be performed through a wireless restricted peripheral session application. Similar to the virtual machine approach, a user can select to enter a "peripheral access mode" (or log in as a guest peripheral session, etc.) and the computing device launches the wireless restricted peripheral session application that provides access to peripheral devices, associated drivers, wireless communications, etc. but blocks access to other computing resources. Communications are then routed between the peripheral devices and the mobile device in the wireless restricted peripheral session application.

In some examples, a peripheral access user profile is established in which only a wireless restricted peripheral session application is available. In such an example, the peripheral access user profile can be selected from a user login screen and once logged in, only wireless restricted peripheral session functionality is available. The log in action may or may not require credentials. In some examples, various security measures are required to log in to a peripheral access user account, such as a password, token, temporarily pairing the mobile device and computing device or peripheral using near field communications (NFC), QR code, or other information. The password (if required) or QR code can be physically posted near the computing device, emailed or texted to the visitor, displayed on a monitor or other display device associated with the computing device, or otherwise provided. The permission to establish a wireless restricted peripheral session can be granted for a limited time, and can be granted based on, for example, a visitor's credentials such as an email address, username, a name or token printed or written on a visitor's badge, or an access code received in response to the visitor texting a phone number from a mobile device or emailing to request access.

Granting and restricting access can also be performed through firmware (e.g., firmware 122 of FIG. 1). In some examples, method 200 can further include powering up or rebooting the computing device into a wireless restricted peripheral mode. The rebooting can include loading, by firmware of the computing device, an alternative kernel for the wireless restricted peripheral mode. As opposed to the standard kernel that supports full functionality, the alternative kernel is limited to supporting functionality needed to operate the peripheral devices (e.g., device drivers, etc.) and support wireless communications. Regardless of the approach to granting and restricting access, the wireless restricted peripheral mode can be a low-power mode in which some of the computing resources (e.g., resources to which access is restricted) of the computing device are powered down. In some examples, the primary processing unit is powered down and a secondary (e.g., low-power) processor, programmable logic device, or other device is used for peripheral access. In some examples, the computing device can be rebooted before establishing the wireless restricted peripheral mode or may be required to reboot after a wireless restricted peripheral mode before returning to normal client computer operation. The client computer can take inventory of the configuration of the computer before and after establishing the wireless restricted peripheral mode to compare if any configuration changes have occurred such as a missing keyboard or mouse or other configuration changes.

Figure 3:
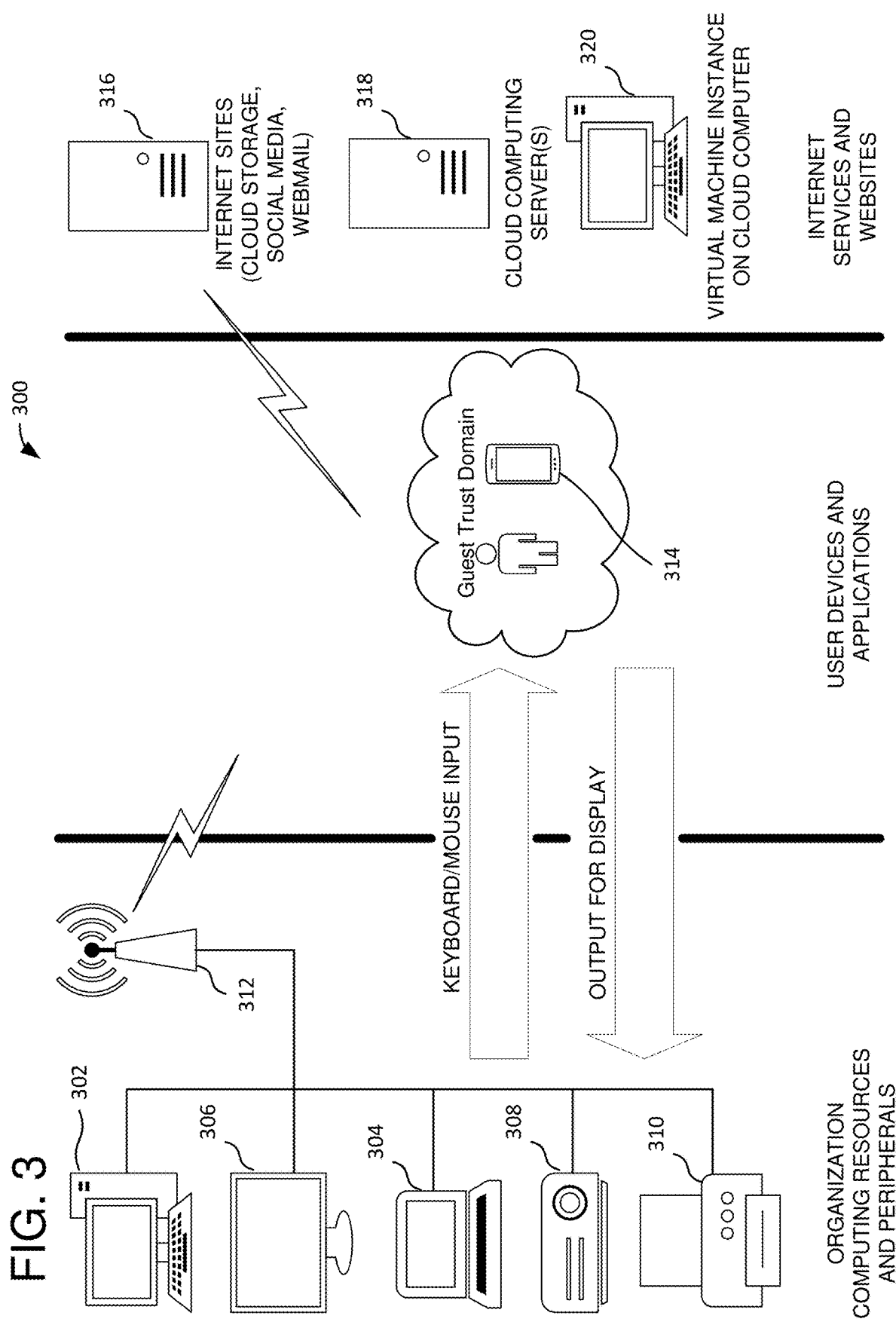
FIG. 3 is a block diagram illustrating interactions between different devices in a wireless restricted peripheral session.

FIG. 3 illustrates an example operating environment 300 in which the described technologies can be implemented. A computing device 302 and a laptop 304 are in communication with several peripheral devices—display 306, projector 308, and printer 310. A keyboard, mouse, VR/AR headset, game controller, CD/DVD drive, SD card slot, or other peripherals are also contemplated. Computing device 302, laptop 304, display 306, projector 308, and printer 310 are also connected, either directly or indirectly through computer 302 or laptop 304, to access point 312, which communicates wirelessly with a mobile device 314. Access point 312 can also be an internal wireless connection of computing device 302 or laptop 304.

Mobile device 314 is part of a "Guest Trust Domain" in which a user brings a mobile device, such as mobile device 314, a laptop, or another device to an organization and connects to peripherals, such as display 306, projector 308, or printer 310, in a wireless restricted peripheral session. Mobile device 314 can also access internet sites 316 (such as cloud storage, social media sites, or other websites), cloud computing server(s) 318, or cloud-based virtual machine instance 320. Mobile device 314 can receive input, such as keyboard or mouse input, from peripheral devices associated with computing device 302 or laptop 304 and provide output for display on display 306, projector 308, or other peripheral device associated with computing device 302 or laptop 304.

Figure 4:
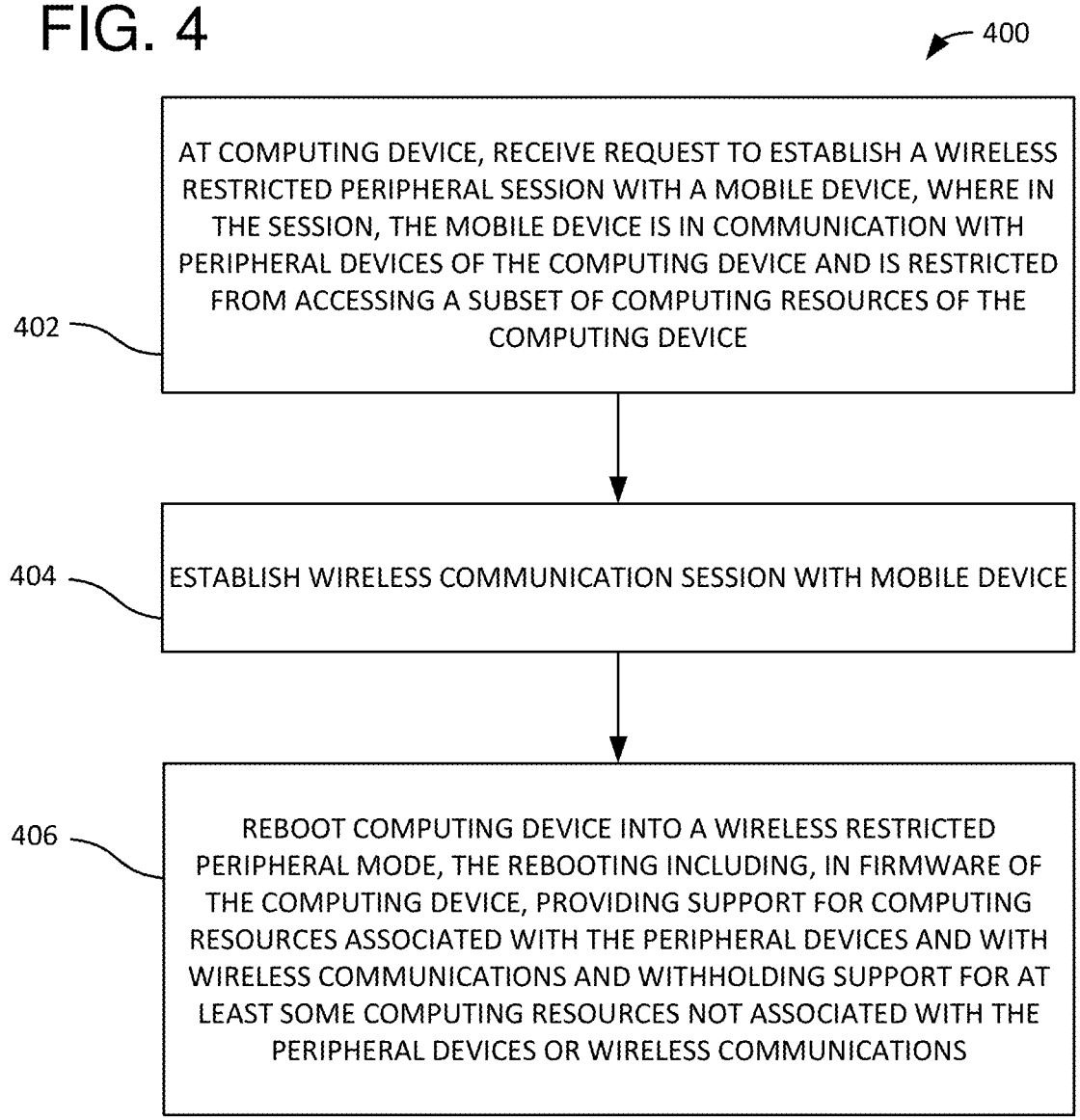
FIG. 4 is an example wireless restricted peripheral session method in which a computing device is rebooted into a wireless restricted peripheral mode.

FIG. 4 illustrates a wireless restricted peripheral session method 400. In process block 402, a request to establish a wireless restricted peripheral session with a mobile device is received at a computing device (such as computing device 100 of FIG. 1 or computing device 302 of FIG. 3). The request can be initiated at the mobile device or the computing device and can be initiated though a hardware switch/ button selection or a user interface. In the wireless restricted peripheral session, the mobile device is in communication with one or more peripheral devices associated with the computing device and is restricted from accessing a subset of computing resources of the computing device. In process block 404, a wireless communication session is established with the mobile device.

The computing device is rebooted, in process block 406, into a wireless restricted peripheral mode. The rebooting can include in firmware of the computing device, providing support for computing resources of the computing device associated with operation of the peripheral devices and associated with wireless communications and withholding support for at least some computing resources of the computing device not associated with operation of the one or more peripheral devices or wireless communications. For example, in firmware, an alternate kernel specific to the wireless restricted peripheral mode can be loaded upon rebooting (or powering up) instead of a standard kernel. The alternate kernel enables use of and provides support for peripheral devices and wireless communications but not for other computing resources. In some examples, the wireless communication session of process block 404 is established after the computing device is rebooted into the wireless restricted peripheral mode. The wireless restricted peripheral mode can be a low-power mode in which the computing resources of the computing device not associated with operation of the peripheral devices or wireless communications are either powered down or operated in a low-power setting.

Figure 5:
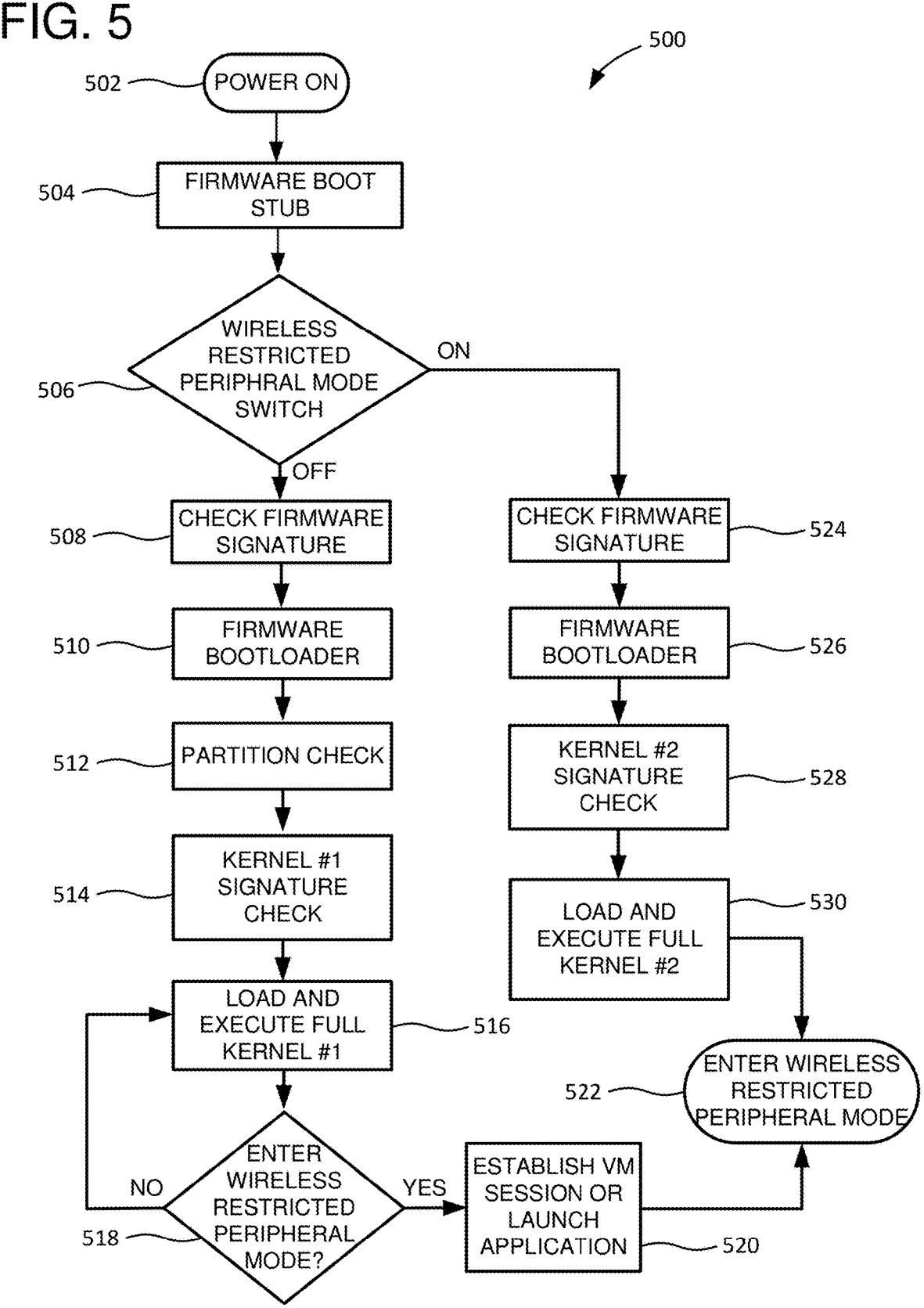
FIG. 5 is an example wireless restricted peripheral session method in which a wireless restricted peripheral mode can be entered through a hardware interface or a software user interface.

FIG. 5 illustrates an example wireless restricted peripheral session method 500 in which a wireless restricted peripheral mode can be entered through a hardware interface or a software user interface. In process block 502, a computing device is powered on or restarted. On initial power up or after a reset, the computing device can execute code stored in, for example, nonvolatile storage of the computing device. In some examples, the code contains a cryptographic signature to ensure it has not be compromised by a malicious attacker.

In process block 504, an initial firmware boot stub is loaded. The initial firmware boot stub can perform a peripheral sharing mode switch feature in decision box 506, or load from, e.g., non-volatile storage on the motherboard, through a memory or I/O interface from flash memory, or removable attached storage such as USB or secure digital (SD) card, serial ATA disk, etc., code that supports the normal mode of operation. In some examples, the system can set a persistent flag in RAM or non-volatile storage before powering down or resetting that will indicate whether the firmware should boot into the peripheral sharing mode or the normal operating system. In some examples, pressing a hardware switch or button sets the flag or otherwise instructs the firmware whether to boot into the peripheral sharing mode.

When the wireless restricted peripheral mode switch feature in decision box 506 indicates normal operation rather than peripheral sharing, a firmware signature check is performed in process block 508. In process block 510, a firmware bootloader is loaded. In some examples, a firmware signature check is performed when the firmware boot stub is loaded in process block 504. In different examples, the decision to boot into the peripheral sharing mode rather than normal operation can be made at different boot path operation points. In some examples, monolithic boot images are broken up into blocks of storage that have a set of common features; this can provide an architectural layout that can assist in manufacturing common subassemblies.

In process block 512, a partition check is performed, and in process block 514, a signature check is performed for the standard kernel (shown as "KERNEL #1" in FIG. 5). The standard kernel is then loaded and executed in process block 516. At this point in method 500, the computing device is in a normal/standard operating mode. When the standard kernel is being executed, an option can be provided to reboot into the peripheral sharing mode, establish a virtual machine session, launch a peripheral sharing application, or log into a peripheral access account. In decision box 518, a determination is made as to whether a wireless restricted peripheral session is requested. A request can be received though a hardware button or switch or through a software user interface. If a request has not been received, the standard kernel continues to be executed in process block 516. If a request has been received, then a virtual machine session can be established, a wireless restricted peripheral session application can be launched, or an account with access limited to peripheral functionality can be logged into in process block 520. The wireless restricted peripheral mode is then entered in process block 522.

When the wireless restricted peripheral mode switch feature in decision box 506 indicates peripheral sharing operation ("ON") rather than normal operation, a firmware signature check is performed in process block 524. In process block 526, a firmware bootloader is loaded, and in process block 528 a kernel signature check is performed for the alternate kernel (shown as "KERNEL #2" in FIG. 5). In process block 530, the alternate kernel is loaded and executed, and in process block 522, the wireless restricted peripheral mode is entered.

Figure 6:
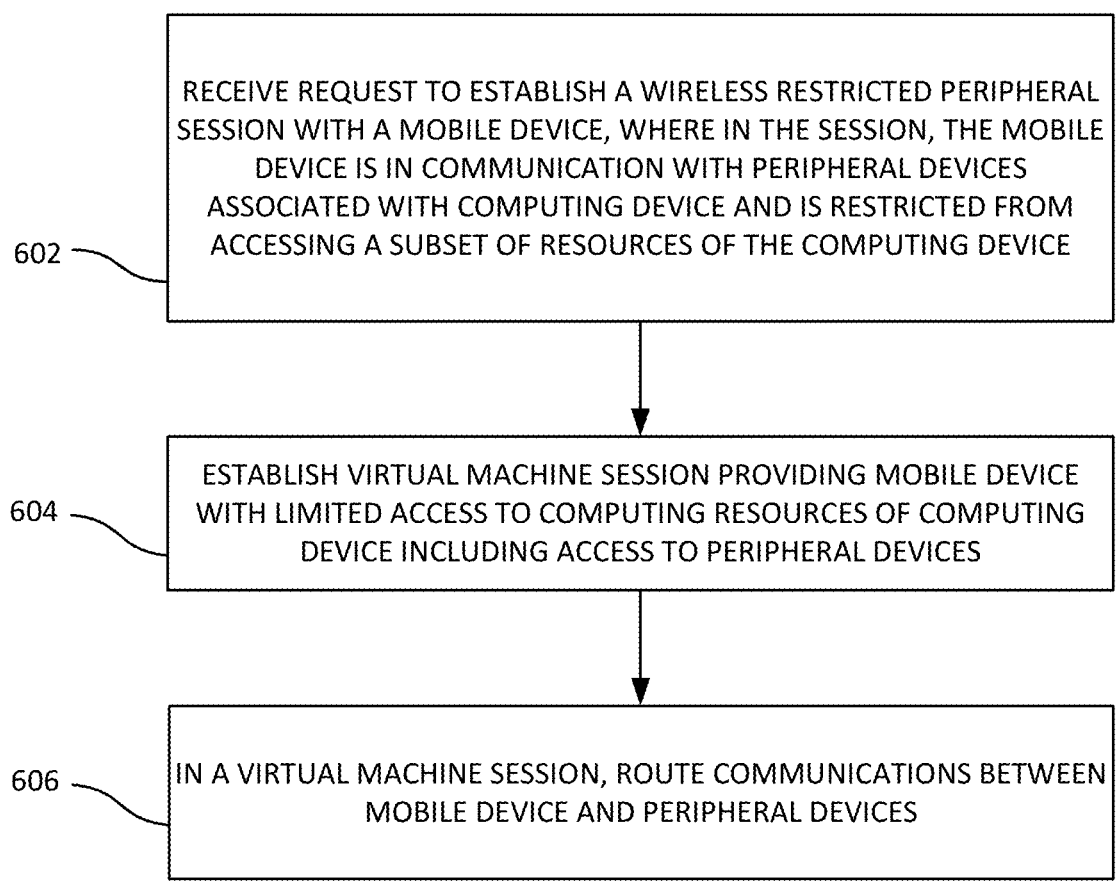
FIG. 6 illustrates an example wireless restricted peripheral session method in which a virtual machine session is established.

FIG. 6 illustrates a wireless restricted peripheral session method 600 in which a virtual machine session is established. In process block 602, a request to establish a wireless restricted peripheral session with a mobile device is received. In the wireless restricted peripheral session, the mobile device is in communication with one or more peripheral devices associated with the computing device and is restricted from accessing a subset of computing resources of the computing device. In process block 604, a virtual machine session is established providing the mobile device with limited access to computing resources of the computing device. The limited access provides access to the one or more peripheral devices and denies access to the subset of computing resources. In process block 606, communications are routed between the mobile device and the one or more peripheral devices in the virtual machine session. The one or more peripheral devices include at least one of a display, a projector, a keyboard, or a mouse. Routing the communications comprises at least one of providing input received through the keyboard or the mouse to the mobile device or providing information from the mobile device to the display or the projector.

In some embodiments, the virtual machine session providing the mobile device with limited access to computing resources of the computing device is hosted in the cloud. The cloud provider can be an independent service or one offered or subscribed to by the business, school, or organization the user is visiting with their mobile device. The organizational computing system can send and receive information with a cloud-hosted account that is connected to the mobile device of the user. In such an example, keyboard and mouse inputs are sent to the cloud-hosted application or virtual machine hosting the application and the mobile device receives these inputs and outputs the updated display information that is presented on the computing device. A third-party hosting the cloud-provided instance that brokers the inputs and output between the organizational computing device and the user's mobile device that enables the wireless restricted peripheral sharing can enable trust between the various entities involved in the system. The cloud provider can provide logging and filtering of the activities allowed between the devices. Not all instances of the wireless restricted peripheral session are the same across different organizations or users; a user or enterprise may pay more for additional services such as high definition video, support for peripherals besides keyboard, mouse, and display, etc.

Figure 7:
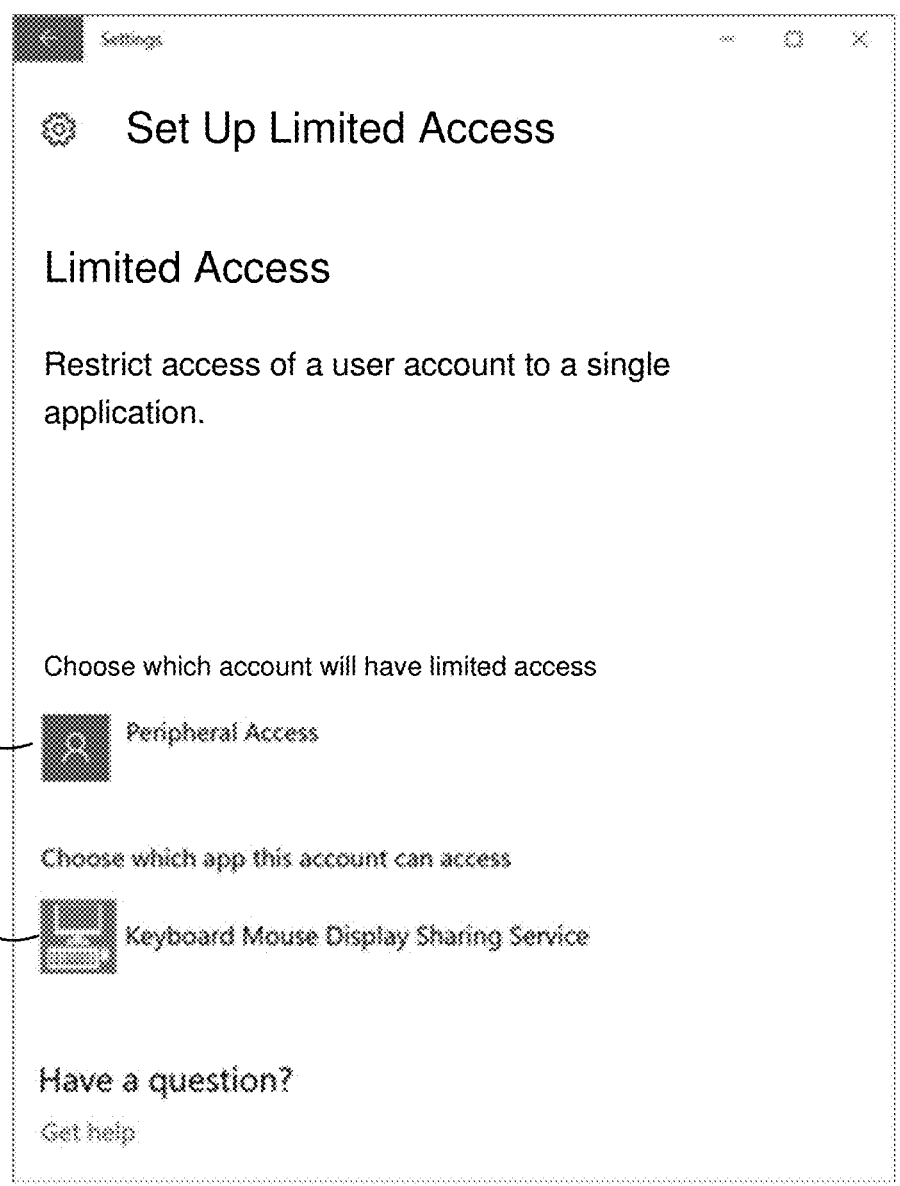
FIG. 7 illustrates an example user interface in which user access can be limited to a single application.

FIG. 7 illustrates an example user interface 700 for establishing a "Limited Access" mode. In user interface 700, "Peripheral Access" account 702 is selected as the account that will have limited access. Application(s) to which Peripheral Access account 702 will have access can also be selected in user interface 700. In FIG. 7, "Keyboard Mouse Display Sharing Service" 704 is selected as the application to which Peripheral Access account 702 has access. Keyboard Mouse Display Sharing Service 704 is an application that limits access to peripherals, wireless communications, and supporting functionality. In this way, a designated account can be established for sharing peripheral devices in which available functionality is limited to that associated with peripheral devices. Once a limited access mode account is established, a guest or visitor can change accounts from a lock screen or other user interface, select Peripheral Access account 702, and connect to the computer via the guest's mobile phone or other device.

Figure 8:
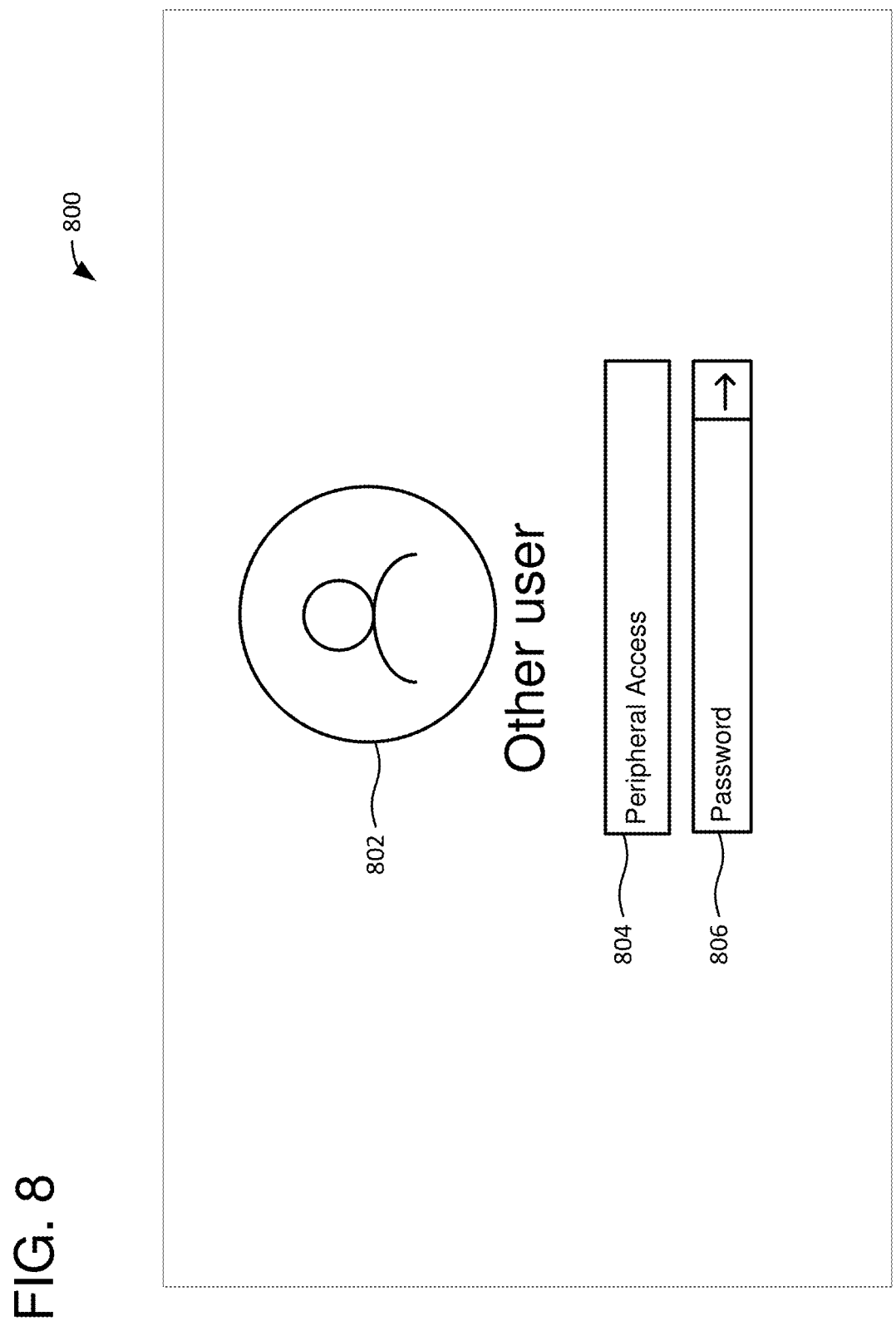
FIG. 8 illustrates an example user interface for logging into a wireless restricted peripheral mode.

FIG. 8 illustrates a user interface 800 in which a user has selected to log in or change user accounts. User interface 800 includes an account icon 802, an account selection box 804, and a password entry box 806. In FIG. 8, "Peripheral Access" is selected as the account to change to or log in to. In some examples, a password is not required for the Peripheral Access account. In other examples, a physical password can be posted near the computer or elsewhere in the organization to ensure that the person logging in with peripheral access is physically present.

Figure 9:
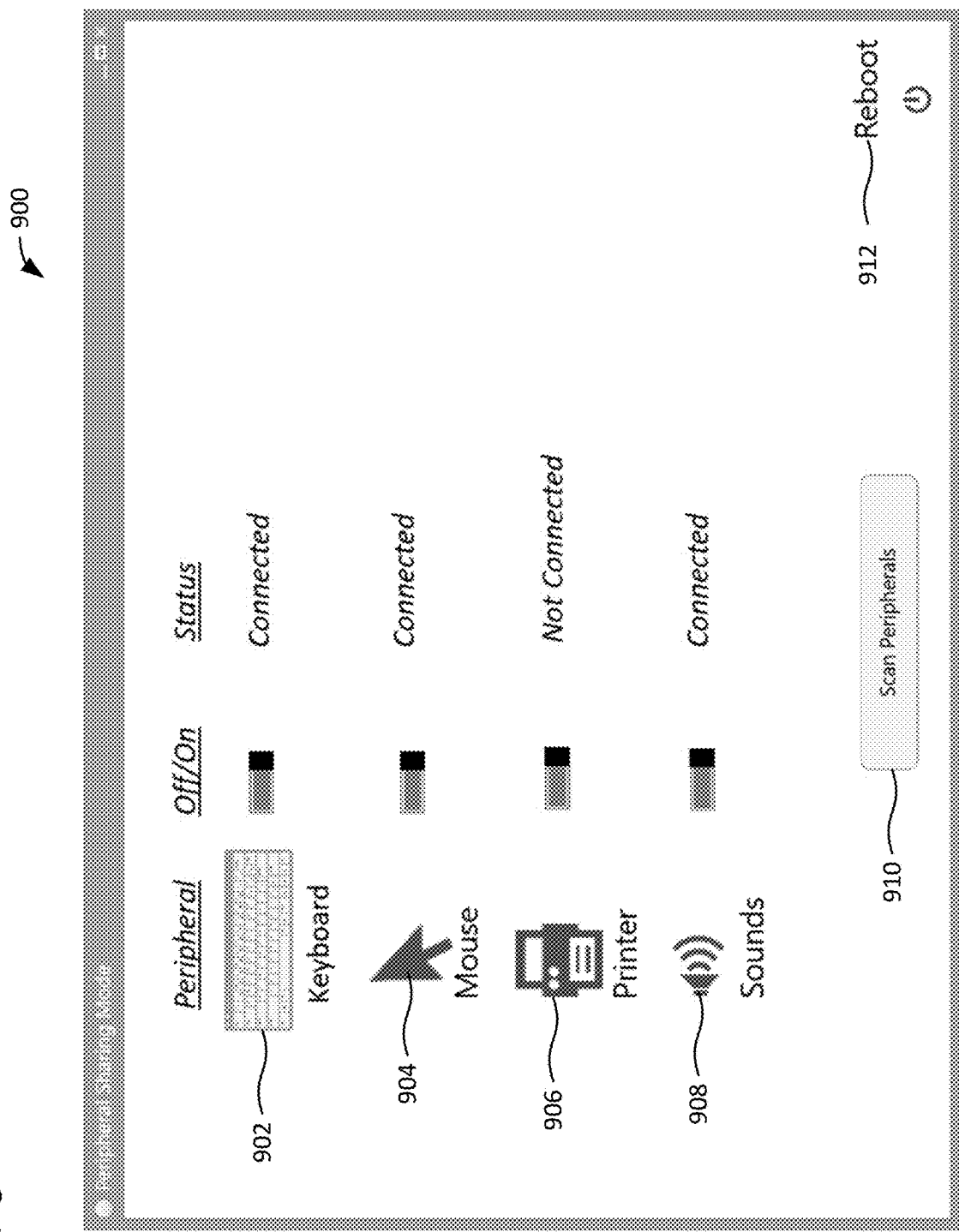
FIG. 9 illustrates an example user interface for managing peripheral devices in a wireless restricted peripheral mode.

FIG. 9 illustrates a peripheral sharing mode management user interface 900. In user interface 900, different peripherals, here shown as keyboard 902, mouse 904, printer 906, and sounds (speakers) 908 are listed, along with an off/on toggle switch and a connection status. User interface 900 can be presented to a user who is about to enter a wireless restricted peripheral access mode or to a user who is establishing a Peripheral Access account or otherwise setting up peripheral access functionality for future use. If the toggle switch next to one of keyboard 902, mouse 904, printer 906, or sounds (speakers) 908 indicates "off," then access to that peripheral device is not provided in the wireless restricted peripheral access mode. "Scan peripherals" button 910 allows the computing environment to be scanned for peripheral devices (e.g., devices that were not previously selected or have been recently added). In some examples, user interface 900 includes a "Reboot" button 912 to allow the user to reboot and enter a wireless restricted peripheral access mode after managing the peripheral devices as shown in FIG. 9.

Figure 10:
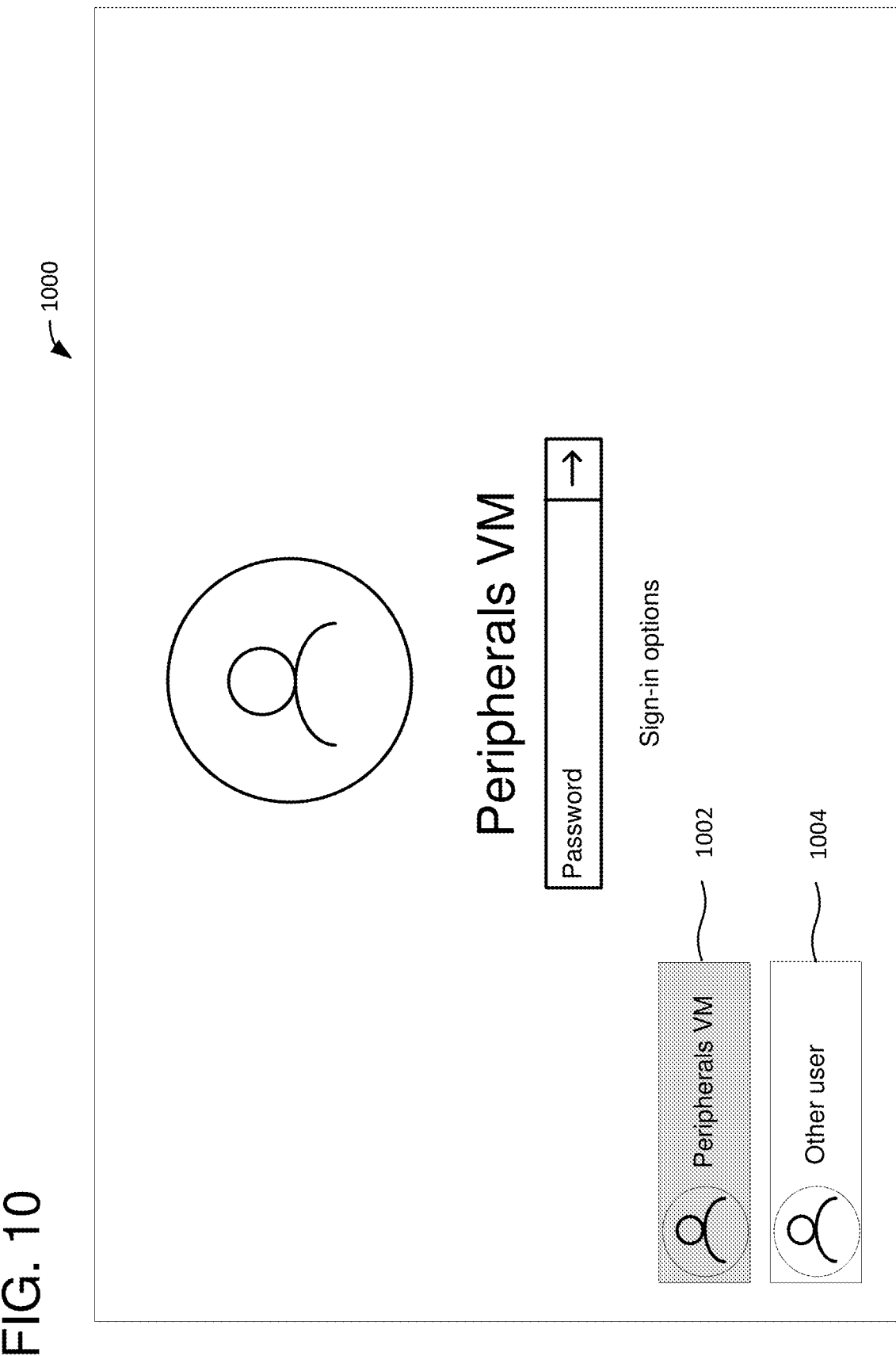
FIG. 10 illustrates an example user interface for establishing a wireless restricted peripheral mode virtual machine session.

FIG. 10 illustrates a user interface 1000 in which a user can log in to a "Peripherals VM" (virtual machine) account. User interface 1000 shows available accounts on the left, including "Peripherals VM" account 1002 and "Other user" account 1004. User interface 1000 can be displayed, for example, after a user selects to enter a peripheral sharing mode from a lock screen.

Wireless restricted peripheral sessions can be terminated through inactivity, user choice, or expiration of a predetermined time period (e.g., one hour). In some examples, only particular computers in an organization are configured to allow wireless restricted peripheral sessions (e.g., computers associated with projectors, printers, etc. in conference rooms, laboratories, or other areas).

Example Computing Systems

Figure 11:
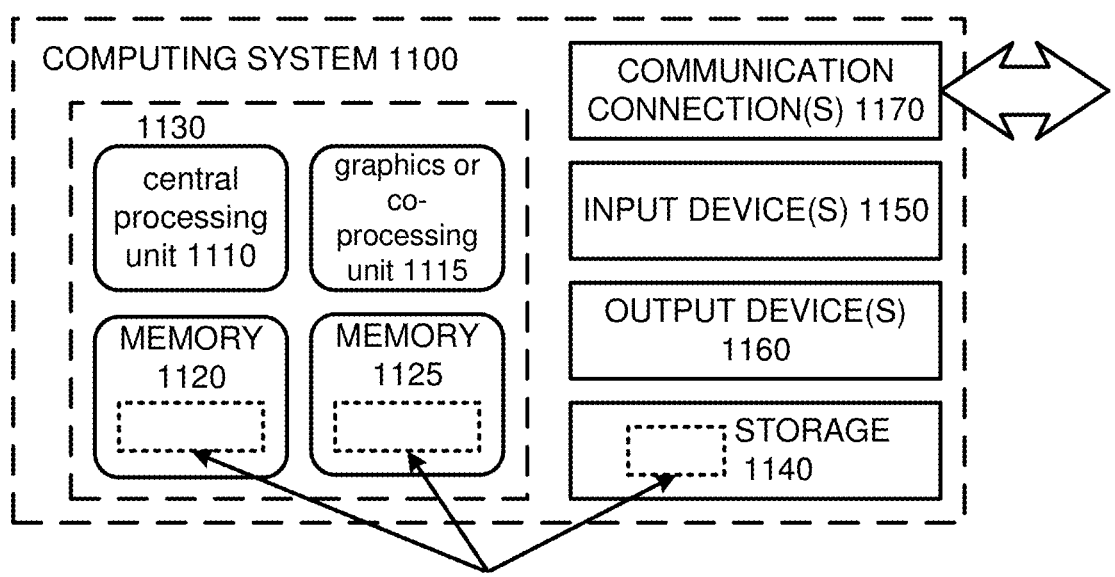
FIG. 11 is a diagram of an example computing system in which some described examples can be implemented.

FIG. 11 depicts a generalized example of a suitable computing system 1100 in which the described innovations may be implemented. The computing system 1100 is not intended to suggest any limitation as to scope of use or functionality, as the innovations may be implemented in diverse general-purpose or special-purpose computing systems.

With reference to FIG. 11, the computing system 1100 includes one or more processing units 1110, 1115 and memory 1120, 1125. In FIG. 11, this basic configuration 1130 is included within a dashed line. The processing units 1110, 1115 execute computer-executable instructions. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 11 shows a central processing unit 1110 as well as a graphics processing unit or co-processing unit 1115. The tangible memory 1120, 1125 may be volatile memory (e.g., registers, cache, RAM), non-volatile memory (e.g., ROM, EEPROM, flash memory, etc.), or some combination of the two, accessible by the processing unit(s). The memory 1120, 1125 stores software 1180 implementing one or more innovations described herein, in the form of computer-executable instructions suitable for execution by the processing unit(s). For example, memory 1120, 1125 can store software configured to implement a wireless restricted peripheral session.

A computing system may have additional features. For example, the computing system 1100 includes storage 1140, one or more input devices 1150, one or more output devices 1160, and one or more communication connections 1170. An interconnection mechanism (not shown) such as a bus, controller, or network interconnects the components of the computing system 1100. Typically, operating system software (not shown) provides an operating environment for other software executing in the computing system 1100, and coordinates activities of the components of the computing system 1100.

The tangible storage 1140 may be removable or non-removable, and includes magnetic disks, magnetic tapes or cassettes, CD-ROMs, DVDs, or any other medium which can be used to store information and which can be accessed within the computing system 1100. The storage 1140 stores instructions for the software 1180 implementing one or more innovations described herein. For example, storage 1140 can store software configured to implement a wireless restricted peripheral session.

The input device(s) 1150 may be a touch input device such as a keyboard, mouse, pen, or trackball, a voice input device, a scanning device, or another device that provides input to the computing system 1100. For video encoding, the input device(s) 1150 may be a camera, video card, TV tuner card, or similar device that accepts video input in analog or digital form, or a CD-ROM or CD-RW that reads video samples into the computing system 1100. The output device(s) 1160 may be a display, printer, speaker, CD-writer, or another device that provides output from the computing system 1100.

The communication connection(s) 1170 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example Mobile Devices

Figure 12:
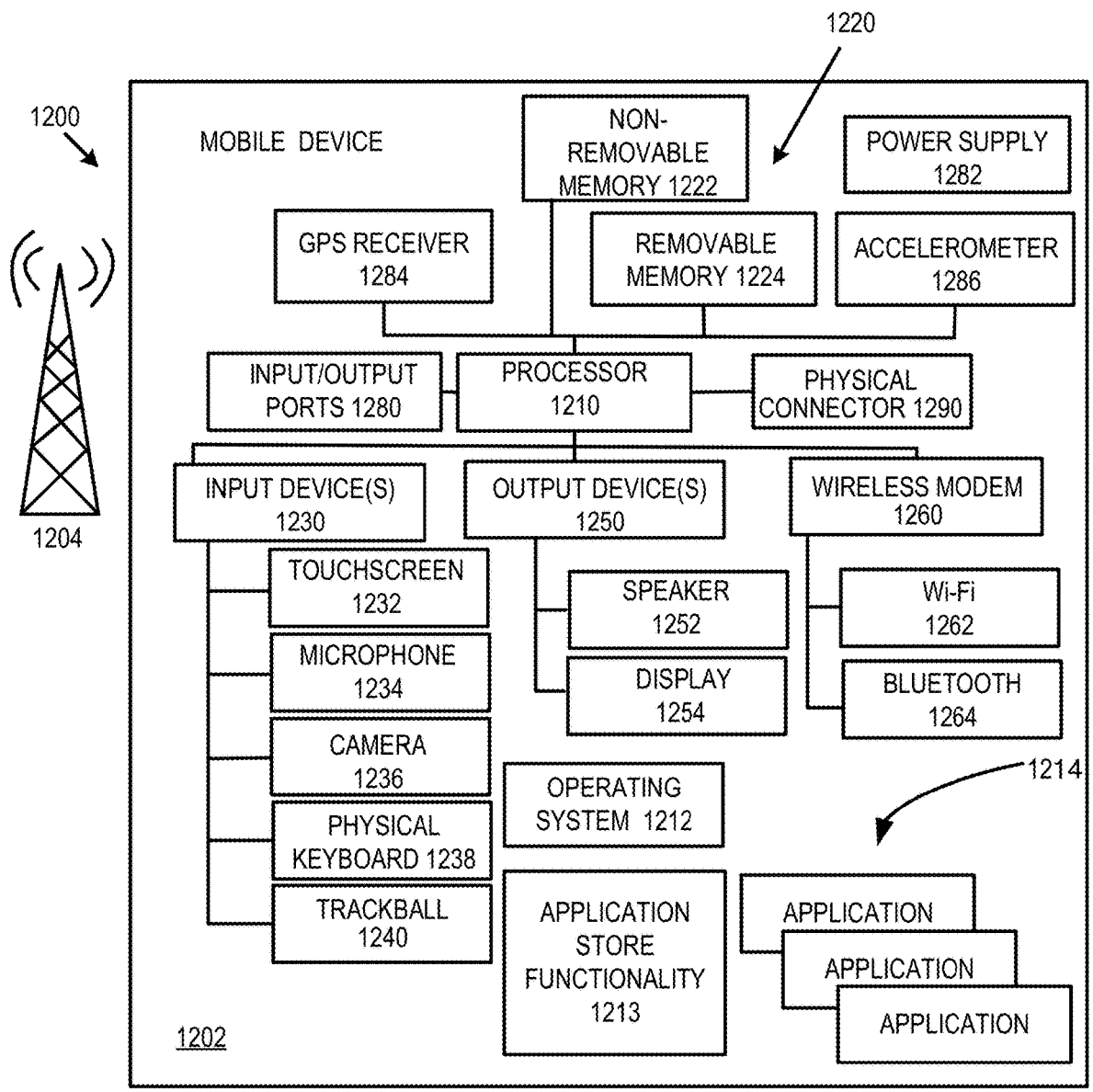
FIG. 12 is an example mobile device that can be used in conjunction with the technologies described herein.

FIG. 12 is a system diagram depicting an example mobile device 1200 including a variety of optional hardware and software components, shown generally at 1202. Any components 1202 in the mobile device can communicate with any other component, although not all connections are shown, for ease of illustration. The mobile device can be any of a variety of computing devices (e.g., cell phone, smartphone, handheld computer, Personal Digital Assistant (PDA), etc.) and can allow wireless two-way communications with one or more mobile communications networks 1204, such as a cellular, satellite, or other network.

The illustrated mobile device 1200 can include a controller or processor 1210 (e.g., signal processor, microprocessor, ASIC, or other control and processing logic circuitry) for performing such tasks as signal coding, data processing, input/output processing, power control, and/or other functions. An operating system 1212 can control the allocation and usage of the components 1202 and support for one or more application programs 1214. The application programs can include common mobile computing applications (e.g., email applications, calendars, contact managers, web browsers, messaging applications), or any other computing application. The application programs 1214 can also include a peripheral access application. Functionality 1213 for accessing an application store can also be used for acquiring and updating application programs 1214.

The illustrated mobile device 1200 can include memory 1220. Memory 1220 can include non-removable memory 1222 and/or removable memory 1224. The non-removable memory 1222 can include RAM, ROM, flash memory, a hard disk, or other well-known memory storage technologies. The removable memory 1224 can include flash memory or a Subscriber Identity Module (SIM) card, which is well known in GSM communication systems, or other well-known memory storage technologies, such as "smart cards." The memory 1220 can be used for storing data and/or code for running the operating system 1212 and the applications 1214. Example data can include web pages, text, images, sound files, video data, or other data sets to be sent to and/or received from one or more network servers or other devices via one or more wired or wireless networks. The memory 1220 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 1200 can support one or more input devices 1230, such as a touchscreen 1232, microphone 1234, camera 1236, physical keyboard 1238 and/or trackball 1240 and one or more output devices 1250, such as a speaker 1252 and a display 1254. Other possible output devices (not shown) can include piezoelectric or other haptic output devices. Some devices can serve more than one input/output function. For example, touchscreen 1232 and display 1254 can be combined in a single input/output device.

The input devices 1230 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 1212 or applications 1214 can comprise speech-recognition software as part of a voice user interface that allows a user to operate the device 1200 via voice commands. Further, the device 1200 can comprise input devices and software that allows for user interaction via a user's spatial gestures, such as detecting and interpreting gestures to provide input to a gaming application.

A wireless modem 1260 can be coupled to an antenna (not shown) and can support two-way communications between the processor 1210 and external devices, as is well understood in the art. The modem 1260 is shown generically and can include a cellular modem for communicating with the mobile communication network 1204 and/or other radio-based modems (e.g., Bluetooth 1264 or Wi-Fi 1262). The wireless modem 1260 is typically configured for communication with one or more cellular networks, such as a GSM network for data and voice communications within a single cellular network, between cellular networks, or between the mobile device and a public switched telephone network (PSTN).

The mobile device can further include at least one input/output port 1280, a power supply 1282, a satellite navigation system receiver 1284, such as a Global Positioning System (GPS) receiver, an accelerometer 1286, and/or a physical connector 1290, which can be a USB port, IEEE 1394 (FireWire) port, and/or RS-232 port. The illustrated components 1202 are not required or all-inclusive, as any components can be deleted and other components can be added.

Example Cloud-Supported Environments

Figure 13:
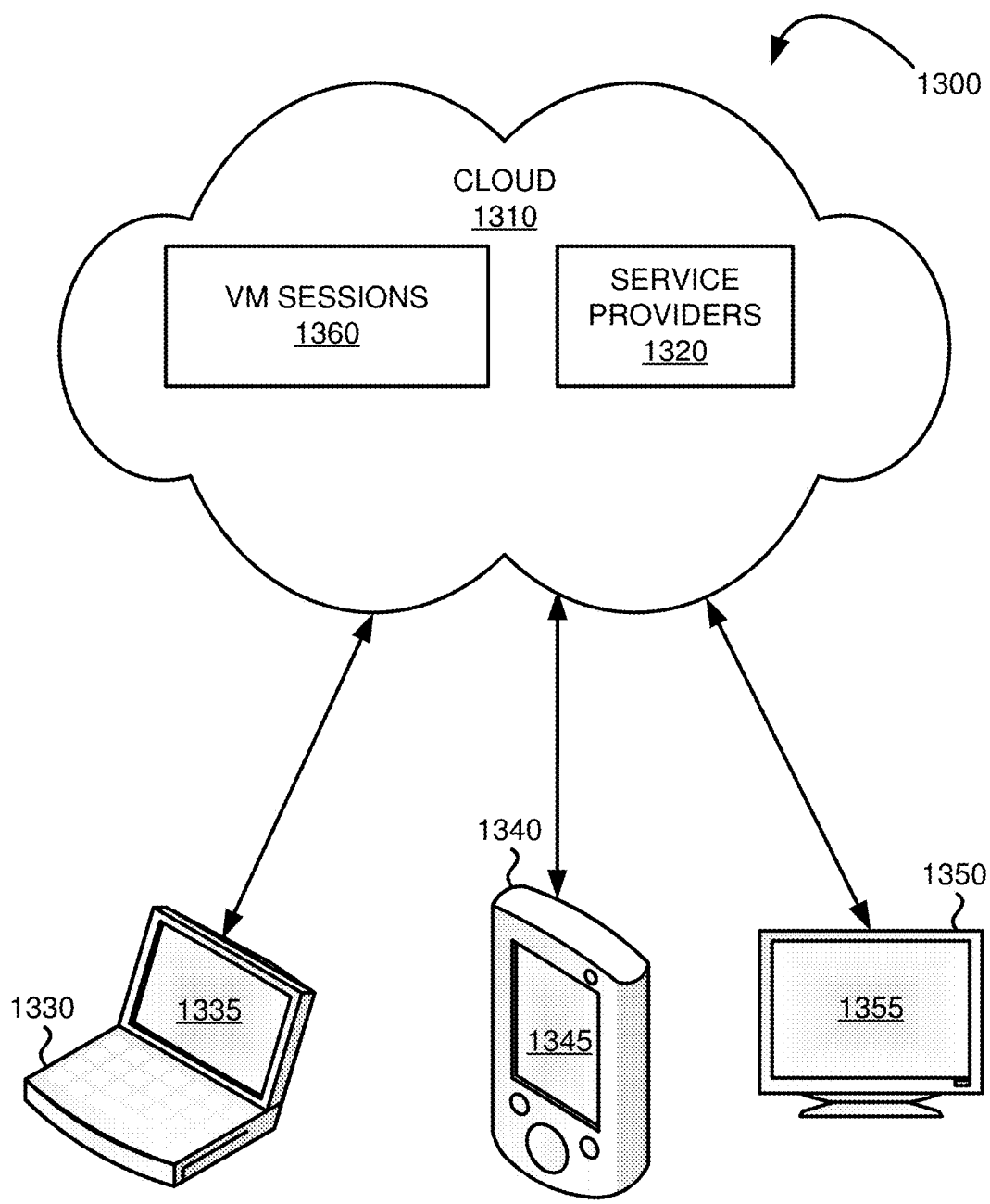
FIG. 13 is an example cloud computing environment in which the technologies described herein can be implemented.

FIG. 13 illustrates a generalized example of a suitable cloud-supported environment 1300 in which described embodiments, techniques, and technologies may be implemented. In the example environment 1300, various types of services (e.g., computing services) are provided by a cloud 1310. For example, the cloud 1310 can comprise a collection of computing devices, which may be located centrally or distributed, that provide cloud-based services to various types of users and devices connected via a network such as the Internet. The implementation environment 1300 can be used in different ways to accomplish computing tasks. For example, some tasks (e.g., processing user input and presenting a user interface) can be performed on local computing devices (e.g., connected devices 1330, 1340, 1350) while other tasks (e.g., storage of data to be used in subsequent processing) can be performed in the cloud 1310.

In example environment 1300, the cloud 1310 provides services for connected devices 1330, 1340, 1350 with a variety of screen capabilities. Connected device 1330 represents a device with a computer screen 1335 (e.g., a mid-size screen). For example, connected device 1330 could be a personal computer such as desktop computer, laptop, notebook, netbook, or the like. Connected device 1340 represents a device with a mobile device screen 1345 (e.g., a small size screen). For example, connected device 1340 could be a mobile phone, smart phone, personal digital assistant, tablet computer, and the like. Connected device 1350 represents a device with a large screen 1355. For example, connected device 1350 could be a television screen (e.g., a smart television) or another device connected to a television (e.g., a set-top box or gaming console) or the like. One or more of the connected devices 1330, 1340, 1350 can include touchscreen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 1300. For example, the cloud 1310 can provide services for one or more computers (e.g., server computers) without displays.

Services can be provided by the cloud 1310 through service providers 1320, or through other providers of online services (not depicted). For example, cloud services can be customized to the screen size, display capability, and/or touchscreen capability of a particular connected device (e.g., connected devices 1330, 1340, 1350). In example environment 1300, the cloud 1310 provides the technologies and solutions described herein to the various connected devices 1330, 1340, 1350 using, at least in part, the service providers 1320. For example, the service providers 1320 can provide a centralized solution for various cloud-based services. The service providers 1320 can manage service subscriptions for users and/or devices (e.g., for the connected devices 1330, 1340, 1350 and/or their respective users). Cloud 1310 can also implement virtual machine sessions 1360.

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 11, computer-readable storage media include memory 1120 and 1125 and storage 1140. By way of example and with reference to FIG. 12, computer-readable storage media include memory 1220, 1222, and 1224. The term computer-readable storage media does not include signals and carrier waves. In addition, the term computer-readable storage media does not include communication connections (e.g., 1170, 1260, 1262, and 1264).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology.

We claim:

1. A computing device, comprising:
   at least one processor;
   at least one antenna; and
   at least one computer-readable storage media storing instructions that, when executed by the at least one processor, cause the computing device to perform operations, the operations comprising:
   establishing, via the at least one antenna, a wireless connection between a mobile device and the computing device;
   establishing a virtual machine session between the mobile device and the computing device over the wireless connection, wherein the virtual machine session is part of a virtual machine running on the computing device, the virtual machine being an emulation of a computer system, and wherein the virtual machine session is established after a wireless restricted peripheral session option is selected from a lock screen presented on a display associated with the computing device;
   granting, via the virtual machine session, the mobile device access to one or more peripheral devices associated with the computing device;
   restricting, via the virtual machine session, access of the mobile device to a subset of computing resources of the computing device; and
   routing communications between the mobile device and the one or more peripheral devices in a wireless restricted peripheral session, wherein routing the communications is performed in the virtual machine session;
   wherein the mobile device is associated with a first user, wherein the first user is associated with the virtual machine session running on the computing device, wherein the virtual machine session is established while a second user, different from the first user, remains logged into the computing device, and wherein the lock screen indicates that the second user will remain logged in to the computing device during operation of the virtual machine session.

2. The computing device of claim 1, wherein the one or more peripheral devices include at least one of a display, a projector, a keyboard, or a mouse, and wherein routing communications comprises at least one of providing input received through the keyboard or the mouse to the mobile device or providing information from the mobile device to the display or the projector.

3. The computing device of claim 1, wherein the operations further comprise launching a wireless restricted peripheral session application, and wherein the communications are routed between the mobile device and the one or more peripheral devices in the wireless restricted peripheral session application.

4. The computing device of claim 1, wherein the operations further comprise rebooting the computing device into a wireless restricted peripheral mode.

5. The computing device of claim 4, wherein rebooting comprises loading, by firmware of the computing device, an alternative kernel for the wireless restricted peripheral mode.

6. The computing device of claim 4, wherein the wireless restricted peripheral mode is a low-power mode in which some of the computing resources of the computing device are powered down.

7. The computing device of claim 1, wherein the mobile device is associated with the first user, wherein the operations are performed while the second user is logged in on the computing device, and wherein the mobile device is restricted from accessing computing resources associated with the second user in the wireless restricted peripheral session.

8. The computing device of claim 1, wherein the computing device is associated with an enterprise, and wherein the first user associated with the mobile device does not have an account with the enterprise.

9. At least one computer-readable storage media storing instructions that, when executed, cause a computing device to perform operations, the operations comprising:
   receiving a request to establish a wireless restricted peripheral session with a mobile device, wherein in the wireless restricted peripheral session, the mobile device is in communication with one or more peripheral devices associated with the computing device and is restricted from accessing a subset of computing resources of the computing device;
   establishing a virtual machine session providing the mobile device with limited access to computing resources of the computing device, wherein the limited access provides access to the one or more peripheral devices and denies access to the subset of computing resources, wherein the virtual machine session is part of a virtual machine running on the computing device, the virtual machine being an emulation of a computer system, and wherein the virtual machine session is established after a wireless restricted peripheral session option is selected from a lock screen presented on a display associated with the computing device; and
   in the virtual machine session, routing communications between the mobile device and the one or more peripheral devices, wherein routing the communications is performed in the virtual machine session;
   wherein the mobile device is associated with a first user, wherein the first user is associated with the virtual machine session running on the computing device, wherein the virtual machine session is established while a second user, different from the first user, remains logged into the computing device, and wherein the lock screen indicates that the second user will remain logged in to the computing device during operation of the virtual machine session.

10. The computer-readable storage media of claim 9, wherein the computing device is associated with an organization, and wherein the user associated with the mobile device does not have an account with the organization.

11. The computer-readable storage media of claim 9, wherein the operations further comprise ending the virtual machine session after a predetermined duration of inactivity.

12. A method, implemented by a computing device, the method comprising:

establishing a wireless connection between a mobile device and the computing device;

establishing a virtual machine session between the mobile device and the computing device over the wireless connection, wherein the virtual machine session is part of a virtual machine running on the computing device, the virtual machine being an emulation of a computer system, and wherein the virtual machine session is established after a wireless restricted peripheral session option is selected from a lock screen presented on a display associated with the computing device;

granting, via the virtual machine session, the mobile device access to one or more peripheral devices associated with the computing device;

restricting, via the virtual machine session, access of the mobile device to a subset of computing resources of the computing device; and routing communications between the mobile device and the one or more peripheral devices in a wireless restricted peripheral session, wherein routing the communications is performed in the virtual machine session;

wherein the mobile device is associated with a first user, wherein the first user is associated with the virtual machine session running on the computing device, wherein the virtual machine session is established while a second user, different from the first user, remains logged into the computing device, and wherein the lock screen indicates that the second user will remain logged in to the computing device during operation of the virtual machine session.

13. The method of claim 12, wherein the one or more peripheral devices include at least one of a display, a projector, a keyboard, or a mouse, and wherein routing the communications comprises at least one of providing input received through the keyboard or the mouse to the mobile device or providing information from the mobile device to the display or the projector.

14. The method of claim 12, further comprising launching a wireless restricted peripheral session application, and wherein the communications are routed between the mobile device and the one or more peripheral devices in the wireless restricted peripheral session application.

15. The method of claim 12, further comprising rebooting the computing device into a wireless restricted peripheral mode.

16. The method of claim 12, wherein the mobile device is associated with the first user, wherein the operations are performed while the second user is logged in on the computing device, and wherein the mobile device is restricted from accessing computing resources associated with the second user in the wireless restricted peripheral session.

17. The method of claim 12, wherein the computing device is associated with an enterprise, and wherein the first user associated with the mobile device does not have an account with the enterprise.

18. The computer-readable storage media of claim 9, wherein the one or more peripheral devices include at least one of a display, a projector, a keyboard, or a mouse, and wherein routing the communications comprises at least one of providing input received through the keyboard or the mouse to the mobile device or providing information from the mobile device to the display or the projector.

* * * * *